(12) United States Patent
Burke et al.

(10) Patent No.: US 12,173,434 B2
(45) Date of Patent: Dec. 24, 2024

(54) SPACER FABRIC WITH WARP KNIT LAYER, COMPOSITE MATERIAL, AND A TRIM COVER

(71) Applicant: LEAR CORPORATION, Southfield, MI (US)

(72) Inventors: David W. Burke, Palmyra, PA (US); Steven J. Cooper, Harrisburg, PA (US)

(73) Assignee: LEAR Corporation, Southfield, MI (US)

( * ) Notice: Subject to any disclaimer, the term of this patent is extended or adjusted under 35 U.S.C. 154(b) by 0 days.

(21) Appl. No.: 17/701,081

(22) Filed: Mar. 22, 2022

(65) Prior Publication Data

US 2022/0307170 A1    Sep. 29, 2022

Related U.S. Application Data

(60) Provisional application No. 63/167,216, filed on Mar. 29, 2021.

(51) Int. Cl.
*D04B 21/20* (2006.01)
*B32B 5/02* (2006.01)
(Continued)

(52) U.S. Cl.
CPC ............. *D04B 21/20* (2013.01); *B32B 5/026* (2013.01); *B32B 5/073* (2021.05); *B32B 5/26* (2013.01);
(Continued)

(58) Field of Classification Search
CPC ................... D04B 21/20; D04B 21/14; D10B 2403/021; D10B 2403/0213; D10B 2403/0241;
(Continued)

(56) References Cited

U.S. PATENT DOCUMENTS 6,196,032 B1 * 3/2001 Rock ..................... D04B 21/02
442/304
6,477,865 B1    11/2002 Matsumoto
(Continued)

FOREIGN PATENT DOCUMENTS

CN        1404539 A      3/2003
CN    101037827 A      9/2007
(Continued)

OTHER PUBLICATIONS

Chinese Office Action Dated Jun. 10, 2023, Application No. 202210313905.9, 11 Pages.
(Continued)

*Primary Examiner* — Cheryl Juska
(74) *Attorney, Agent, or Firm* — BROOKS KUSHMAN P.C.

(57) ABSTRACT

According to one or more embodiments, a three-dimensional spacer fabric comprises a first knit layer, a second knit layer and monofilament spacer yarns extending between and connecting the first and second knit layers. The first knit layer comprises pillar stitches and lay in stitches working together to form the first knit layer and the second knit layer comprising a mesh fabric formed of a mirrored stitch formation. The spacer fabric has a compression force deflection, as measured by ISO3386-1, in the machine direction (MD) of 10 to 15 kPa. The spacer fabric can be secured to a trim material to form a trim cover.

19 Claims, 7 Drawing Sheets

(51) Int. Cl.
*B32B 5/06* (2006.01)
*B32B 5/26* (2006.01)
*B32B 9/02* (2006.01)
*B32B 9/04* (2006.01)

(52) U.S. Cl.
CPC .............. *B32B 9/025* (2013.01); *B32B 9/047* (2013.01); *B32B 2601/00* (2013.01); *D10B 2403/021* (2013.01)

(58) Field of Classification Search
CPC ........... B21B 5/026; B21B 5/06; B21B 5/073; B21B 7/03; B21B 9/025; B21B 2601/00; B21B 2605/08
See application file for complete search history.

(56) References Cited

U.S. PATENT DOCUMENTS

| | | | |
|---|---|---|---|
| 7,197,801 B2 | 4/2007 | Bajic et al. | |
| 7,837,263 B2 | 11/2010 | Booth et al. | |
| 8,286,451 B2 | 10/2012 | Mueller et al. | |
| 10,065,543 B2 | 9/2018 | Persson et al. | |
| 10,132,032 B2 | 11/2018 | Kammerer et al. | |
| 11,041,263 B2 | 6/2021 | Mueller et al. | |
| 2009/0036907 A1* | 2/2009 | Bayon ................... A61L 27/56 606/151 | |
| 2010/0045079 A1 | 2/2010 | Andersson et al. | |
| 2013/0097777 A1 | 4/2013 | Marquette et al. | |
| 2016/0263857 A1 | 9/2016 | Mueller et al. | |
| 2017/0071032 A1 | 3/2017 | Mueller et al. | |
| 2017/0096088 A1 | 4/2017 | Persson et al. | |
| 2018/0154843 A1* | 6/2018 | Townley .................. B32B 3/08 | |
| 2018/0187348 A1 | 7/2018 | Mueller et al. | |
| 2018/0251094 A1 | 9/2018 | Aust | |
| 2019/0193373 A1 | 6/2019 | Alexander et al. | |
| 2020/0253713 A1* | 8/2020 | Rocco .................... A61L 27/26 | |
| 2020/0263334 A1 | 8/2020 | Mueller et al. | |
| 2020/0340152 A1 | 10/2020 | Mueller et al. | |
| 2022/0296428 A1* | 9/2022 | Cohade ................. D04B 21/18 | |

FOREIGN PATENT DOCUMENTS

| | | |
|---|---|---|
| CN | 101519827 A | 9/2009 |
| CN | 103266409 A | 8/2013 |
| CN | 106012271 A | 10/2016 |
| CN | 108251954 A | 7/2018 |
| CN | 111850802 A | 10/2020 |
| JP | 3054824 U | 12/1998 |
| JP | 2013234399 A | 11/2013 |
| WO | 2021032931 A1 | 2/2021 |

OTHER PUBLICATIONS

Second Office Action for Chinese Application No. 202210313905.9, dated Feb. 29, 2024, 23 Pages (including English translation).

* cited by examiner

SPACER FABRIC WITH WARP KNIT LAYER, COMPOSITE MATERIAL, AND A TRIM COVER

CROSS-REFERENCE TO RELATED APPLICATIONS

This application claims the benefit of U.S. provisional application Ser. No. 63/167,216 filed Mar. 29, 2021, the disclosure of which is hereby incorporated in its entirety by reference herein

TECHNICAL FIELD

One or more embodiments relate to a spacer fabric with one or more warp knit layers, a composite material made of the spacer fabric, and a trim cover made of the spacer fabric.

BACKGROUND

Spacer fabrics are versatile and as such are usable in many different applications. A spacer fabric is flexible and thus easily bendable. A spacer fabric can also be air permeable. Another feature found in most spacer fabrics is resilience.

Due to the various advantageous properties of a spacer fabric, the spacer fabric can be used in a variety of applications including, but not limited to: furniture, such as seats, mattresses and upholstered articles; vehicular components, such as climate- and non-climate automobile seats, trim and seat covers, and trim panels, such as door panels, dashboards, consoles, and headliners; and wearable articles such as, athletic shoes and clothing.

Spacer fabrics can be useable as a composite material. Suitable composite materials comprise a spacer fabric sandwiched between a cover layer, which can be decorative, such as leather, vinyl or fabric, and a base, which can be a rigid or flexible base layer.

SUMMARY

According to one or more embodiments, a three-dimensional spacer fabric is provided comprising a first knit layer, a second knit layer and monofilament spacer yarns extending between and connecting the first and second knit layers. In at least certain embodiments, the first knit layer comprises pillar stitches and lay in stitches working together to form the first knit layer and the second knit layer comprising a mesh fabric formed of a mirrored stitch formation. In at least certain embodiments, the spacer fabric has a compression force deflection, as measured by ISO3386-1, in the machine direction (MD) of 10 to 15 kPa.

According to at least another embodiment, a trim cover is provided comprising a trim layer having an upper surface and a lower surface and a spacer fabric secured to the lower surface of the leather trim layer. In at least one embodiment, the spacer fabric is a three-dimensional spacer fabric comprising a first knit layer, a second knit layer and monofilament spacer yarns extending between and connecting the first and second knit layers. In at least certain embodiments, the first knit layer comprises pillar stitches and lay in stitches working together to form the first knit layer and the second knit layer comprising a mesh fabric formed of a mirrored stitch formation. In at least certain embodiments, the spacer fabric has a compression force deflection, as measured by ISO3386-1, in the machine direction (MD) of 10 to 15 kPa.

According to at least another embodiment, a spacer fabric is provided having a first knit layer, a second knit layer and spacer yarns extending between and connecting the first and second knit layers. The first layer has a first yarn formation and a second yarn formation with the first yarn formation being adjacent the second yarn formation. The first yarn formation has alternating first and second course formations, wherein the first course formation has a first plurality of courses with each of the first plurality of courses being closed and the second course formation has a second plurality of courses having at least one open course and at least one closed course. The second yarn formation has alternating third and fourth course formations, wherein the third course formation has a third plurality of courses having at least one open course and at least one closed course and the fourth course formation has a fourth plurality of courses with each of the fourth plurality of courses being closed. The first course formation is adjacent the third yarn formation and the second course formation is adjacent the fourth course formation.

DETAILED DESCRIPTION

As required, detailed embodiments of the present disclosure are disclosed herein; however, it is to be understood that the disclosed embodiments are merely examples of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
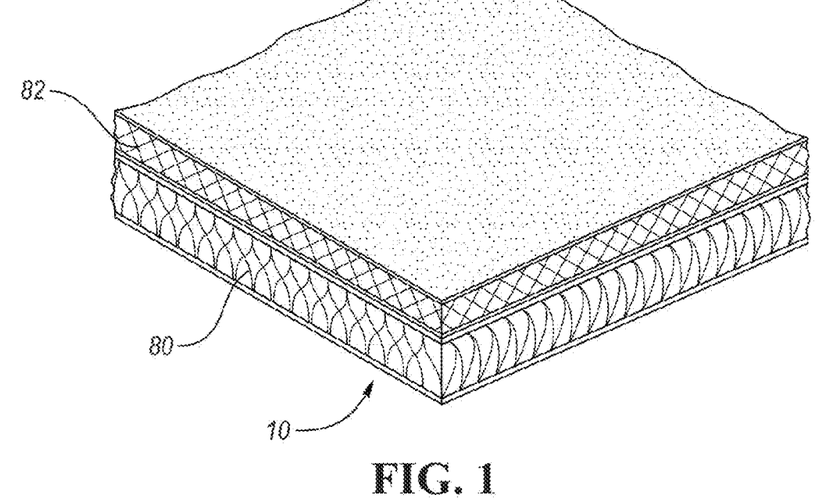
FIG. 1 is a schematic perspective view of a trim cover in accordance with an embodiment of the present disclosure.

With reference to FIG. 1, a representative trim layer 80 having a spacer fabric 10 of the present disclosure is illustrated. The trim layer 80 could be any composite capable of utilizing the spacer layer 10 of the present disclosure and is representatively shown as a leather trim cover 80 for a vehicle seat, with a layer of leather 82 being adhered to the spacer fabric 10. However, it should readily be understood that the composite could be other automotive or non-automotive composites.

Figure 2:
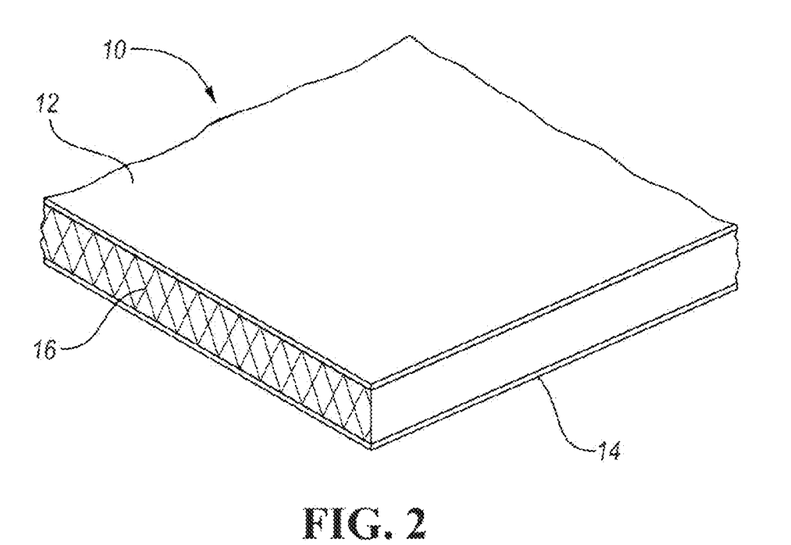
FIG. 2 is a schematic perspective view of a spacer fabric of the trim cover of FIG. 1.

As illustrated schematically in FIG. 2, the spacer layer 10 is a three-dimensional fabric that has a first knit layer 12, a second knit layer 14 and spacer yarns 16 extending between and connecting the first and second knit layers 12 and 14. The two knit layers 12 and 14 have stitches that knit in the length or machine direction as well as traversing in the width or cross direction. The spacer yarns 16 that extend between and connect the first and second knit layers 12 and 14 can be any suitable yarn, such as but not limited to, monofilament yarn.

While the leather trim cover 80 is illustrated as having a layer of leather 82, it should be understood that any suitable cover material could be used, such as, but not limited to, synthetic leather, plastics, such as vinyl, and fabric layers. The trim layer of leather 82, or the decorative layer, can be secured to the spacer fabric 10 by any suitable technique, such as by stitching or adhesive, for instance.

In a general embodiment, the first knit layer 12 of the spacer layer 10 comprises a standard pillar stitch with a notation of 1-0, 0-1 and a lay in stitch with a notation of 0-0, 3-3. These two stitches work in conjunction with each other to help create a flexible fabric, allowing it to contour without appreciable wrinkling when laminated to leather or other materials. The first knit layer 12 is generally the side of the spacer layer 10 that is laminated to perforated leather or other trim materials. In a general embodiment, the connecting spacer yarns 16 are monofilaments and comprise a four-course repeat with a stich notation of 1-0, 2-1, 3-4, 2-3. This stitch helps to create a stable fabric connection that has good compression properties and prevents fabric layover or uneven collapsing under pressure. In at least one embodiment, the spacer fabric 10 has a compression force deflection, as measured by ISO3386-1, in the machine direction (MD) of 10 to 15 kPa, and in at least another embodiment of 11 to 13 kPa. In a general embodiment, the second knit layer 14 is a mesh side that is comprised of 2 pattern bars with mirrored stitch formations. These 2 bars of stitch formations work in conjunction with each other to help create a mesh that contributes to enhanced air flow properties and a desirable level of flexibility. In at least one embodiment, the spacer fabric 10 has an air permeability, as measured by DIN EN ISO 9237 of 3,800 to 4,800 l/dm2×min, and in at least another embodiment of 4,000 to 4,400 l/dm2×min. In at least certain embodiments, the spacer fabric 10 provides a fabric ideal for use in an automobile seat application, such as using a perforated leather or other material outer layer with the spacer fabric 10 being used as the inner layer and being laminated to the perforated outer layer. The spacer fabric 10 can offer good air flow properties, while being both supportive and flexible.

Figure 3:
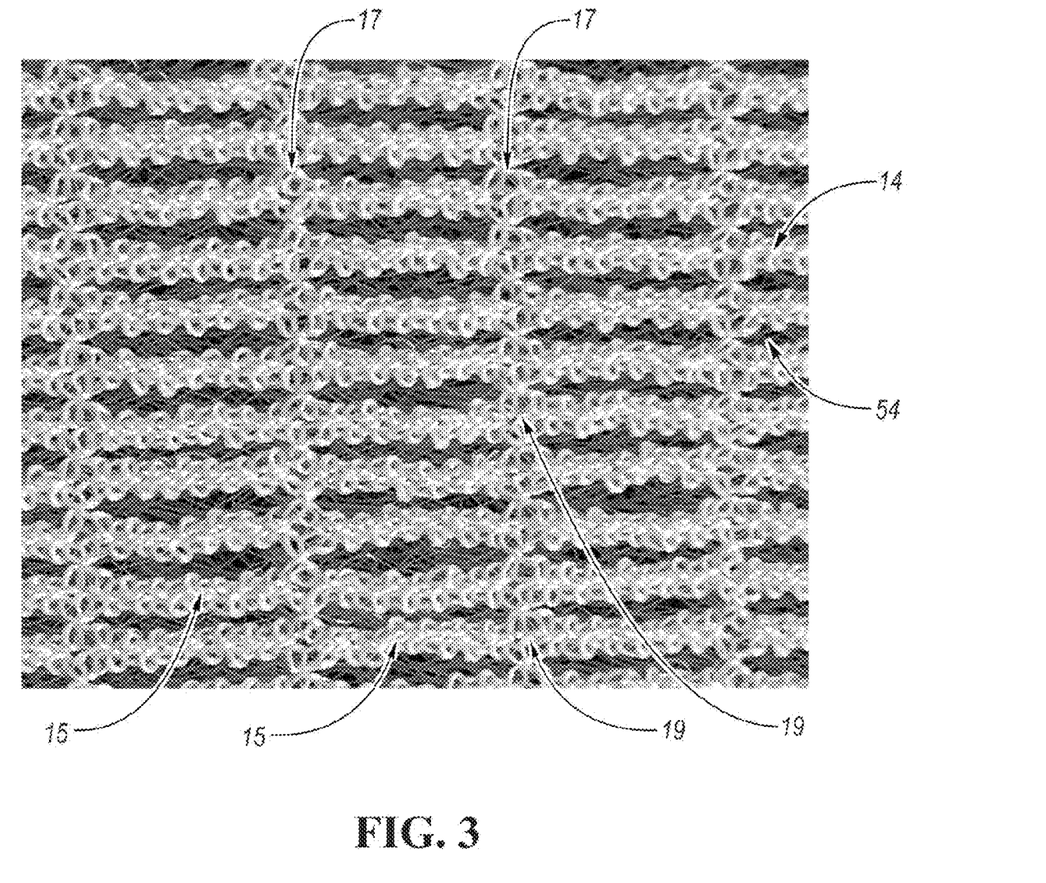
FIG. 3 is a blown-up view of a photograph of an embodiment of a first layer of the spacer fabric of FIG. 2.

Blown-up images of an exemplary embodiment of the second knit layer 14 is shown in FIG. 3. As can be seen in FIG. 3, the second knit layer 14 has an open mesh structure. The open mesh structure of the second knit layer 14 has a plurality of openings 54, defined by generally parallel rows of fabric 15 intersecting generally perpendicular rows of fabric 17 forming intersections 19. As shown in the embodiment illustrated in FIG. 3, the opening 54 are elongated and run in the production direction. The openings 54 can have any suitable size, but in at least one embodiment, are independently 4.7 to 16 mm (3/16 to 10/16 inches) in length and 0.80 to 3.18 mm (1/32 to 4/32 inches) in width. In at least another embodiment, the openings 54 are independently 6.3 to 12.7 mm (4/16 to 8/16 inches) in length and 0.80 to 2.4 mm (1/32 to 3/32 inches) in width, and in at least yet another embodiment are independently 9.5 mm (3/8 inches) in length and 3.18 mm (2/16 inches) in width. While most if not all of the openings fall within the above ranges, it should be understood that some may fall outside the above ranges and still be consistent with the present disclosure. In at least one embodiment, the second knit layer 14 has an open surface area of 30 to 75% based on total surface are of the second knit layer, and in another embodiment is 40 to 60% based on the total surface area of the second knit layer. The mesh side helps to provide sufficient air flow (air permeability) and a level of flexibility which can help to inhibit wrinkling when laminated to leather or other trim material.

Figure 4:
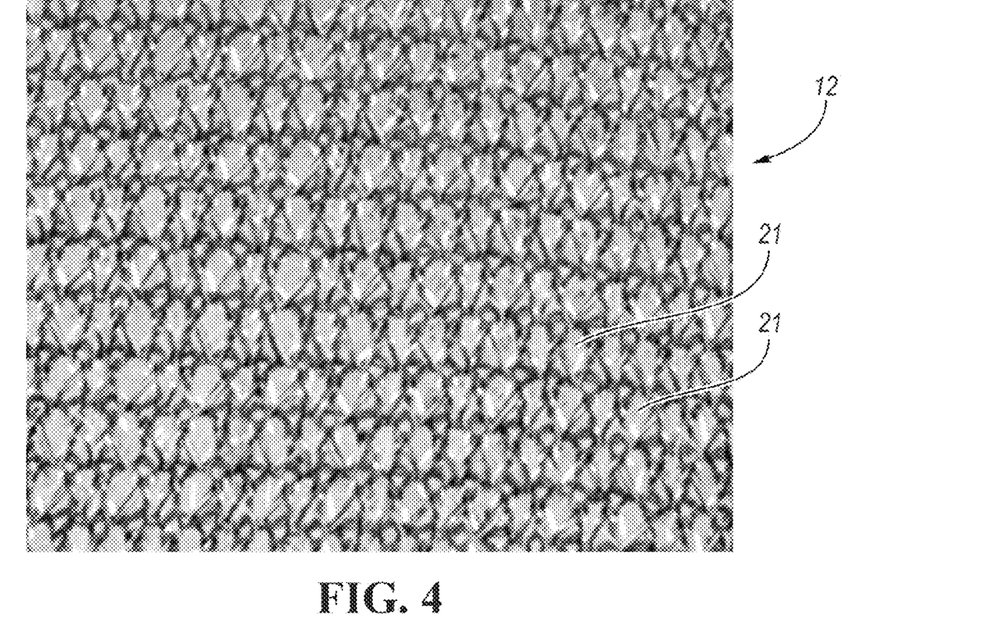
FIG. 4 is a blown-up view of a photograph of an embodiment of a second layer of the spacer fabric of FIG. 2.
Figure 5:
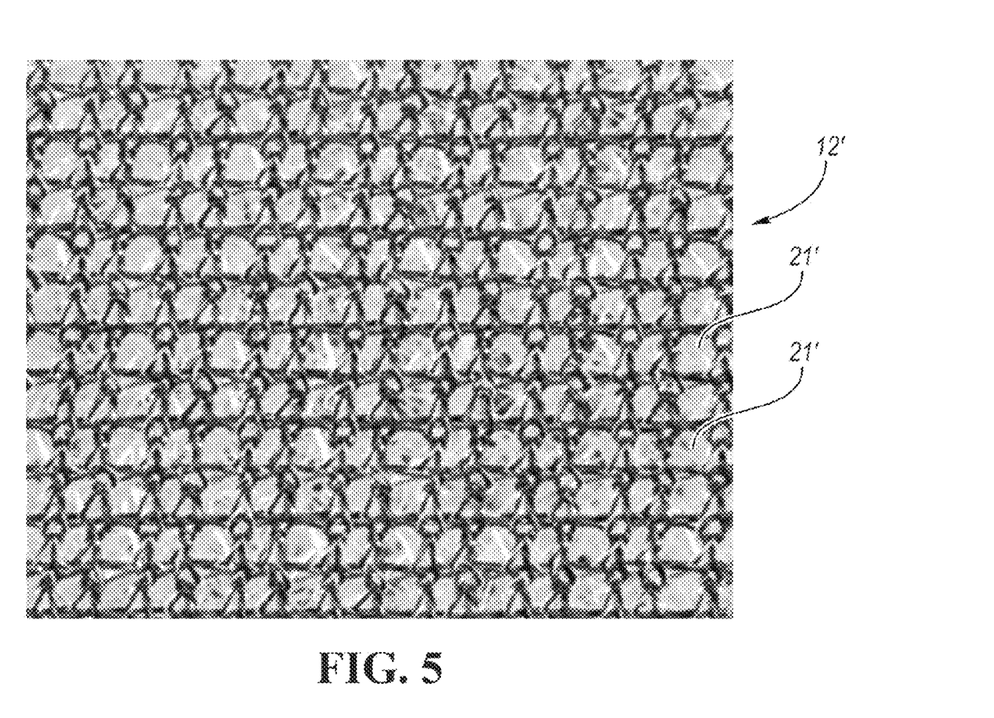
FIG. 5 is a view similar to FIG. 4 showing another embodiment of a second layer of the spacer fabric of FIG. 2.
Figure 9:
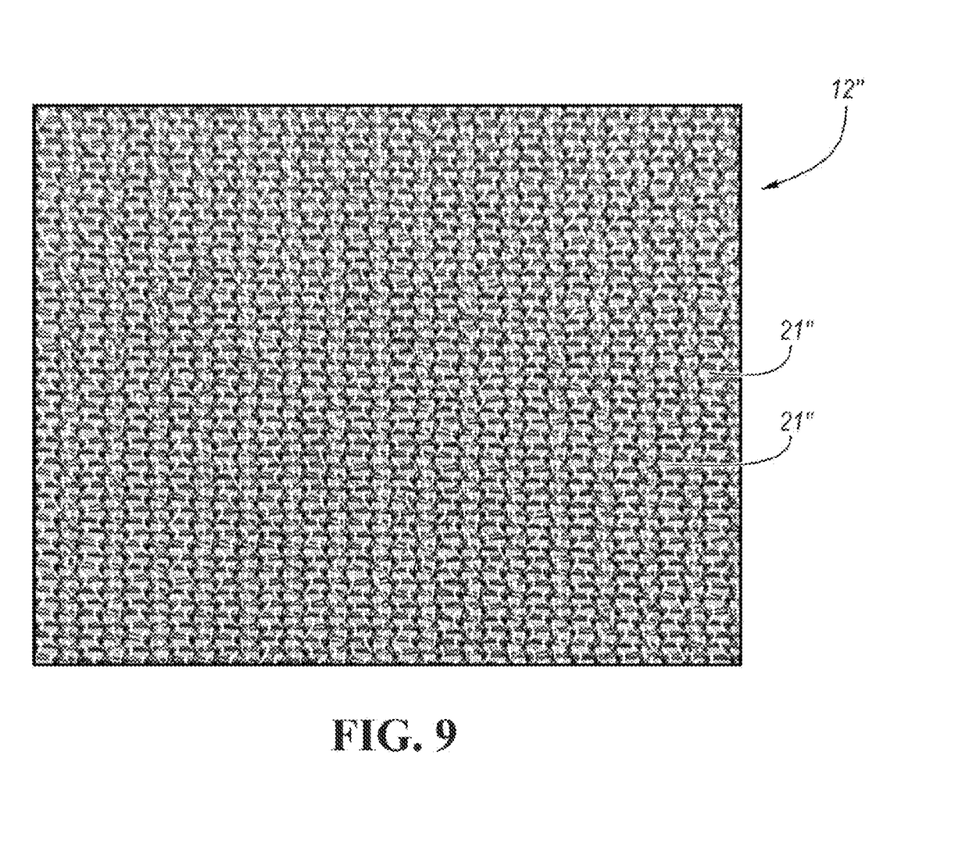
FIG. 9 is a view similar to FIG. 4 showing another embodiment of a second layer of the spacer fabric of FIG. 2.

Blown-up images of an exemplary embodiments of the first knit layer 12, 12' and 12" are shown in FIGS. 4, 5 and 9. As can be seen in FIGS. 4, 5 and 9, the first knit layer 12, 12' and 12" also has an open mesh structure. The open mesh structure of the first knit layer 12, 12' and 12" has a plurality of openings 21, 21' and 21" that are generally smaller than the plurality of openings 54 of the second knit layer 14. As a result, the first knit layer 12 is generally smoother than the second knit layer 14, at least in certain embodiments. Notably, while the knit layer 12" has a substantially solid structure, its openings 21" are smaller than openings 21 and 21', and thus has more of a solid structure.

The openings 21, 21' and 21" in the first knit layer 12, 12' and 12" can have any suitable size, but in at least one embodiment, are independently 0.40 to 3.175 mm (1/64 to 1/8 inches) in length and width, and in at least another embodiment are independently 0.40 to 0.16 mm (1/64 to 1/16 inches) in length and width, and in yet another embodiment are 0.8 mm (1/32 of an inch) in length and width. While most if not all of the openings 21, 21' and 21" fall within the above ranges, it should be understood that some may fall outside the above ranges and still be consistent with the present disclosure. In at least one embodiment, the first knit layer 12, 12' and 12" has an open surface area of 60 to 90% based on the total surface area of the first knit layer, and in another embodiment of 65-85% based on the total surface area of the first knit layer. The first knit layers provide a generally flat side which is laminated to the leather or other trim material. This flat substantially non-mesh side has the two stitch formations that create the flat side, it accepts the laminated leather. The two stitch formations helps to enable the flexibility which can help to inhibit wrinkling when laminated to leather or other trim material.

Figure 6:
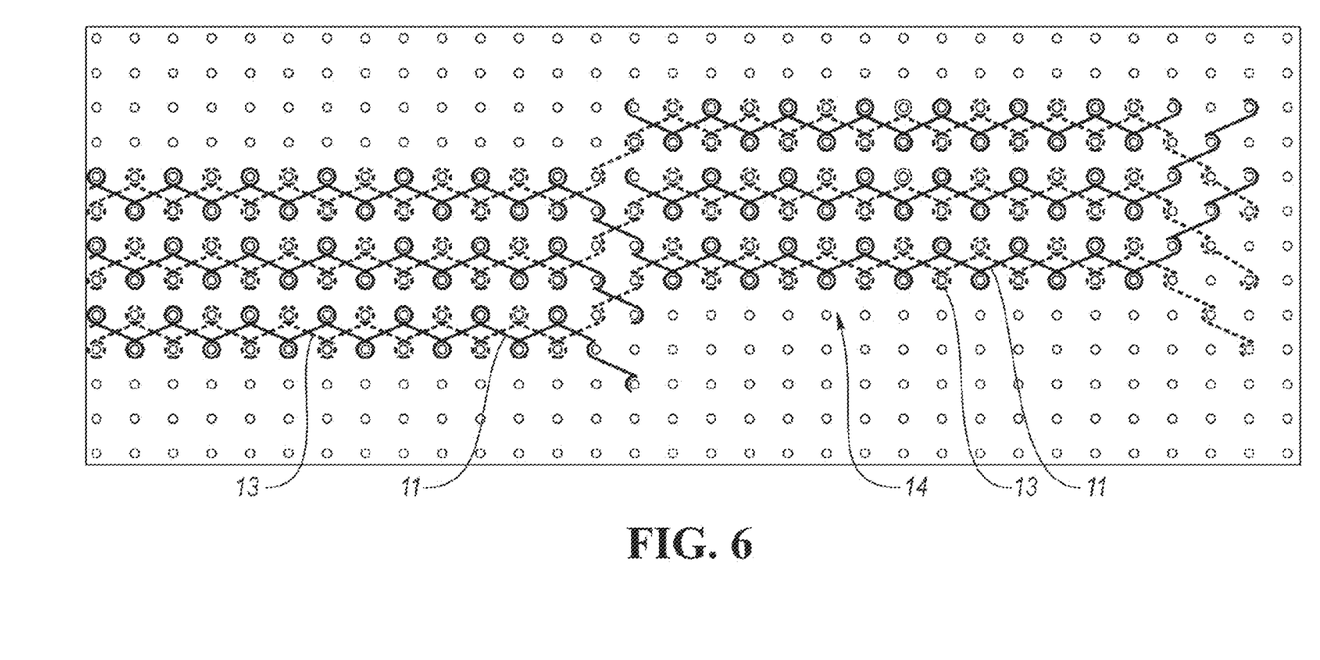
FIG. 6 is a schematic illustration of an embodiment of a yarn formation of the first layer illustrated in FIG. 3.

An exemplary stitch formation of the second knit layer 14 is schematically illustrated in FIG. 6. The stitch formation creates a mesh fabric, as shown schematically in FIG. 3. In at least one embodiment, the second layer 14 has a first yarn formation 11 and a second yarn formation 13 with the first yarn formation 11 being a mirror image of the second yarn formation 13. In at least one embodiment, a Double Needle Bar Knitting Raschel stitching machine uses two pattern bars to create a mesh pattern having 12-24 courses for each mesh opening 54, and in yet another embodiment 18 courses for each mesh opening 54. As shown in the illustrated embodiments, the stitch formations are exact mirrors of each other. In at least one embodiment, the first and second yarn formations 11 and 13 comprise alternating first and second course patterns. In one embodiment, the overall mesh pattern repeat is 30 total courses, 15&15 (15 courses per opening). In one embodiment, the stitches comprise a repeating notation of (3-4, 3-2)×6, 3-4, 3-2, 2-1 (1-0, 1-2)×6, 1-0, 1-2, 2-3 and (1-0, 1-2)×6, 1-0, 1-2, 2-3, (3-4, 3-2)×6, 3-4, 3-2, 2-1, however other similar stitch formations could be used so long as they are two stitch formations that mirror each other and work together to create a mesh pattern.

Figure 7A:
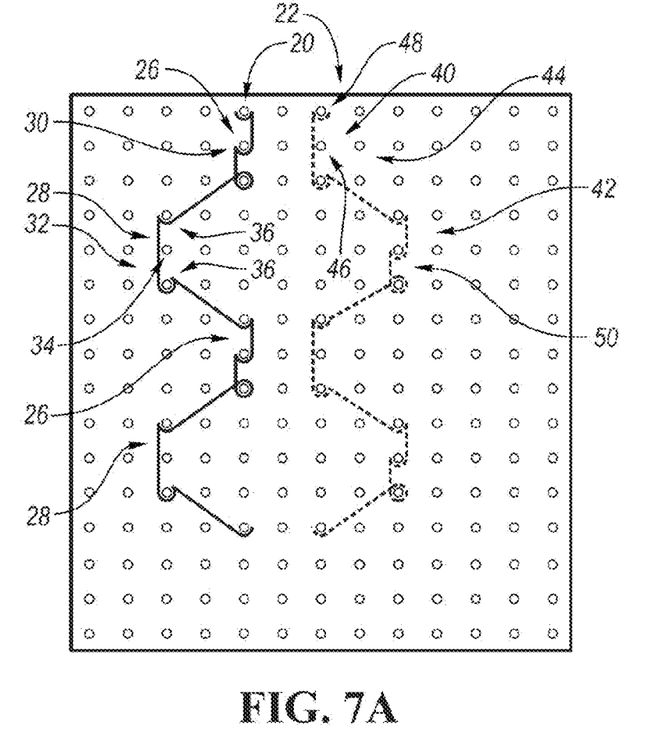
FIG. 7A is a schematic illustration of an embodiment of a yarn formation of the layer illustrated in FIG. 4.
Figure 7B:
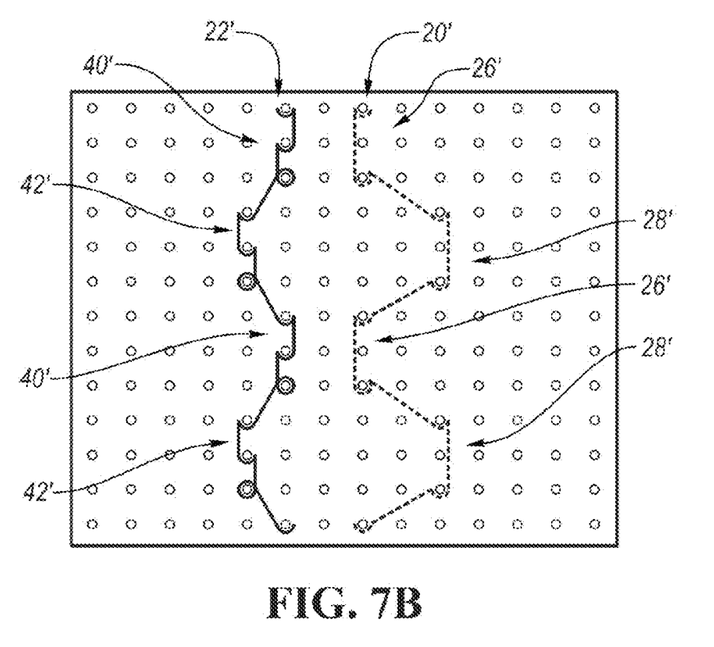
FIG. 7B is a schematic illustration of an embodiment of a yarn formation of the layer illustrated in FIG. 5.

Exemplary stitch formations of the first knit layer 12 and 12' are schematically illustrated in FIGS. 7A and 7B. In FIGS. 7A and 7B, exemplary stitch formations of the first knit layers 12 shown in FIGS. 4 and 5, respectively, are schematically illustrated with the first knit layer 12 of FIG. 4 being shown in FIG. 7A and the first knit layer 12' of FIG. 5 being shown in FIG. 7B.

In at least one embodiment and referring to FIG. 7A, the first layer 12 has a first yarn formation 20 and a second yarn formation 22 with the first yarn formation 20 not being a mirror image of the second yarn formation 22.

In at least one embodiment, the first yarn formation 20 comprising alternating first and second course patterns 26 and 28. In the description below, each course will be successively numbered starting with the first course starting at the left of the figure. In at least one embodiment, as shown in the formations 20 and 22 shown in FIG. 7A, the first course pattern 26 comprises a first plurality of courses 30 with the first course being an open stitch, the second course being an open stitch and the third course being a closed stitch. In at least the illustrated embodiment, each of the courses in the first plurality of courses 30 are in the same needle row. In at least this embodiment, the second course pattern 28 comprises three courses in the same needle row traversed two needles to the left of the first course pattern 26. In the illustrated embodiment, the second course pattern 28 comprises three courses, namely the fourth course, fifth course 34 and sixth course. In this embodiment, fourth course is an open stitch, the fifth course 34 is a floating stitch, and the sixth course is an open stitch. In the illustrated embodiment, the first and second course patterns 26 and 28 then repeat in the same pattern as the first and second course patterns 26 and 28 described above and shown in FIG. 7A.

In at least one embodiment, as shown in the formations 20 and 22 shown in FIG. 7A, the second yarn formation 22 comprising alternating third and fourth course patterns 40 and 42. In at least one embodiment, the third course formation 40 comprises a third plurality of courses 44 comprising at least one floating course 46 and at least one open course 48 and the fourth course pattern 42 comprises a fourth plurality of courses 50 with two open courses and one closed course 50. In the illustrated embodiment in FIG. 7A, the third plurality of courses 44 comprises three courses with the first course being an open stitch, the second course being a floating stitch and the third course being an open stitch. In at least the illustrated embodiment, each of the courses in the third plurality of courses 44 are in the same needle row. In at least this embodiment, the fourth course pattern 50 comprises three courses in the same needle row traversed two needles to the right, that is in the opposite direction as in the second plurality of courses 32, of the third course formation 40. In the illustrated embodiment, the fourth course pattern 50 comprises three courses, namely the fourth, fifth and sixth courses. In this embodiment, fourth course is an open stitch, the fifth course is an open stitch, and the sixth course is a closed stitch. In the illustrated embodiment, third and fourth course patterns 40 and 42 then repeat in the same pattern as the third and fourth course patterns 40 and 42 described above and shown in FIG. 7A. In at least the embodiment illustrated in FIG. 7A, each set of the first and third course patterns 26 and 40 and the second and fourth course patterns 28 and 42, each have one course pattern having a closed course, such as in the first and fourth course patterns 26 and 42, and each have one course pattern having a floating course, such as in the second and third course patterns 28 and 40. Thus each opposing course has a floating course and a closed course in their plurality of courses and each linearly adjacent course has a closed course and a floating course in their plurality of courses.

In at least one embodiment, as shown in the formations 20' and 22' of the first knit layer 12' shown in FIG. 7B, the first course pattern 26' comprises three courses with the first course being an open stitch, the second course being a floating stitch and the third course being an open stitch. In at least the illustrated embodiment, each of the courses in the first course pattern 26' are in the same needle row. In at least this embodiment, the second course pattern 28' comprises three courses in the same needle row traversed two needles to the right of the first course pattern 26'. In the illustrated embodiment, the second course pattern 28' comprises three courses, namely the fourth, fifth and sixth courses. In this embodiment, fourth course is an open stitch, the fifth course is a floating stitch, and the sixth course is an open stitch. In the illustrated embodiment, the first and second course patterns 26' and 28' then repeat in the same pattern as the first and second course patterns 26' and 28' described above and shown in FIG. 7B.

In at least one embodiment, as shown in the formations 20' and 22' shown in FIG. 7B, the second yarn formation 22' comprising alternating third and fourth course patterns 40 and 42. In at least one embodiment, the third course formation 40' comprises three courses with the first course being an open stitch, the second course being an open stitch and the third course being a closed stitch. In at least the illustrated embodiment, each of the courses in the third plurality of courses 44' are in the same needle row. In at least this embodiment, the fourth course pattern 42' comprises three courses in the same needle row traversed one needle to the right, that is in the opposite direction as in the second course pattern 28', of the third course pattern. In the illustrated embodiment, the fourth course pattern 42' comprises three courses, namely the fourth, fifth and sixth courses. In this embodiment, the fourth course is an open stitch, the fifth course is an open stitch, and the sixth course is a closed stitch. In the illustrated embodiment, third and fourth course patterns 40' and 42' illustrated in FIG. 7B then repeat in the same pattern as the third and fourth course patterns 40 and 42 described above and shown in FIG. 7A.

Figure 8:
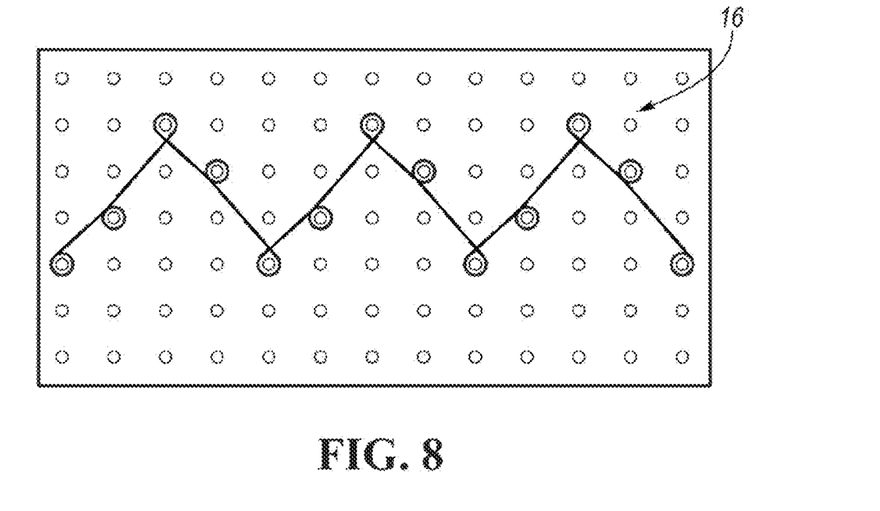
FIG. 8 is a schematic illustration of the yarn formation connecting the first and second layers shown in FIGS. 3 and 4.

An exemplary stitch formation of the spacer yarns 16 is schematically illustrated in FIG. 8. In at least this embodiment, the connecting spacer yarns 16 are monofilaments and comprise a four-course repeat. In at least the illustrated embodiment, the connecting spacer yarns 16 has a stich notation of 1-0, 2-1, 3-4, 2-3. This stitch helps to create a stable fabric connection that has good compression properties and prevents fabric layover or uneven collapsing under pressure. The spacer yarns 16 provide a center connecting area that allows for a maintained thickness, such as 10 mm, but can be mechanically adjusted to offer other thicknesses.

A blown-up image of another exemplary embodiment of the first knit layer 12" is shown in FIG. 9. As can be seen in FIG. 9, the first knit layer 12" also has an open mesh structure, however it is relatively speaking a more solid/smoother knit structure than layers 12 and 12'. The open mesh structure of the first knit layer 12" has a plurality of openings 21" that are generally smaller than the plurality of openings 54 of the second knit layer 14. As a result, the first knit layer 12" is generally smoother than the second knit layer 14, at least in certain embodiments.

Figure 10:
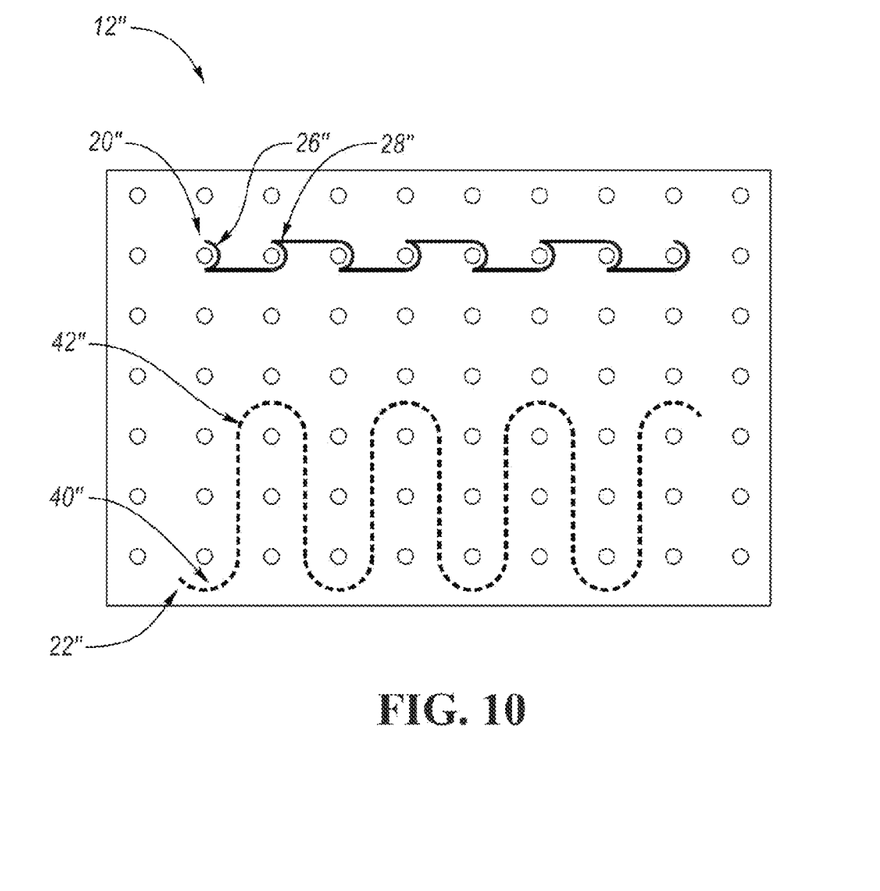
FIG. 10 is a schematic illustration of an embodiment of a yarn formation of the layer illustrated in FIG. 9.

In at least one embodiment and referring to FIG. 10, the first layer 12" has a first yarn formation 20" and a second yarn formation 22" with the first yarn formation 20" not being a mirror image of the second yarn formation 22".

In at least one embodiment, the first yarn formation 20" comprising alternating first and second course patterns 26" and 28" comprising standard open pillar stitches. In the description below, each course will be successively numbered starting with the first course starting at the left of the figure. In at least one embodiment, as shown in the formations 20" and 22" shown in FIG. 10, the first course pattern 26" comprises a first course with the first course being an open stitch, and a second course pattern 28" with the second course being an open stitch. In at least one embodiment, the open pillar stitches 26" and 28" alternate in direction to provide a relatively low yarn torque during the knitting process. In at least the illustrated embodiment, the first yarn formation comprises an open pillar stitch with a repeating notation of 1-0, 0-1. In at least the illustrated embodiment, each of the courses in the first course pattern 26" are in the same needle row. In other embodiments, other pillar stitch formations can be used so long as wrinkling is appreciable inhibited when laminated to leather or other trim material.

In at least one embodiment, as shown in the formations 20" and 22" shown in FIG. 10, the second yarn formation 22" comprising alternating third and fourth course patterns 40" and 42" comprising lay in stitches. In at least one embodiment, the lay in stitches comprise courses formed in the alternatingly spaced needle rows, such as needle rows spaced 2-6 needle rows from adjacent needle rows, and in yet other embodiments, spaced 3-5 needle rows from adjacent needle rows. In at least the illustrated embodiment, the third and fourth course patterns 40" and 42" comprise a plurality of courses traversing over three needles. However, in other embodiments, the courses could traverse over more or less than three needles. In at least the illustrated embodiment, the first yarn formation comprises a lay in stitch with a repeating notation of 0-0, 3-3. In at least one embodiment, other the lay in stitch formations can be used so long as wrinkling is appreciable inhibited when laminated to leather or other trim material.

In at least one embodiment, the spacer layer 10 has a thickness of 8-12 mm, in another embodiment of 8.5-11 mm, and in yet another embodiment of 10 mm.

Tables 1-3 below provide properties of an embodiment of a spacer layer 10.

TABLE 1

| TEST | PROPERTY | UNITS | TEST SPECIFICATION | ONE EMBODIMENT | ANOTHER EMBODIMENT | FURTHER EMBODIMENT |
|---|---|---|---|---|---|---|
| Weight | Weight | g/m2 | GMW3182 | 500-650 | 550-600 | 547.83 |
| Thickness | Thickness | mm | ISO 5084 | 8.0-12.0 | 8.5-11 | 10.22 |
| Fogging | Fogging | mg | GMW3235 | 0.4-0.65 | 0.45-0.6 | 0.52 |
| Odor | Odor | N/A | GMW3205 | 7-9 | 7.5-8.5 | 8 |
| Mildew | Mildew | N/A | GMW3259 | No Mildew | No Mildew | No Mildew |
| Compression Force Deflection | Compression Force Deflection | kPa | ISO3386-1 | 10-15 | 11.5-13.5 | 12.5 |
| ISO/BMW Air Permeability D12/1S | Air Permeability | mm/s | ISO/BMW Air Permeability D12/1S | 800-1,200 | 925-1,100 | 1,024.7 |
| ISO/BMW Air Permeability BMW1 | Air Permeability | mm/s | ISO/BMW Air Permeability BMW1 | 3,000-5,500 | 3,500-5,000 | 4,289 |
| Air Permeability | Air Permeability | 1/dm2 × min | DIN EN ISO 9237 | 1,400-2,000 | 1,500-1,750 | 1,638 |

TABLE 2

| TEST | PROPERTY | UNITS | TEST SPECIFICATION | FIRST EMBODIMENT (MD) | ADDITIONAL EMBODIMENT (MD) | FURTHER EMBODIMENT (MD) |
|---|---|---|---|---|---|---|
| Breaking Strength | Breaking Strength | N | GMW3010 | 150-300 | 175-225 | 193.3 |
| Trapezoid Tear | Tear Strength | N | GMW3326 | 50-150 | 75-125 | 102.37 |
| Trouser Tear | Tear Strength | N | ISO 13937-2 | 20-40 | 25-35 | 31.09 |
| Elongation | Elongation | N | GMW3010 | 12-18 | 13-17 | 15.2 |
| Stretch | Stretch & Set | % | GMW3211 | 20-40 | 25-35 | 31 |
| Set | Stretch & Set | % | GMW3211 | 1-8 | 2-6 | 4 |

TABLE 3

| TEST | PROPERTY | UNITS | TEST SPECIFICATION | FIRST EMBODIMENT (AMD) | ADDITIONAL EMBODIMENT (AMD) | FURTHER EMBODIMENT (AMD) |
|---|---|---|---|---|---|---|
| Breaking Strength | Breaking Strength | N | GMW3010 | 170-325 | 200-250 | 215 |
| Trapezoid Tear | Tear Strength | N | GMW3326 | 30-50 | 37-45 | 41.3 |

TABLE 3-continued

| TEST | PROPERTY | UNITS | TEST SPECIFICATION | FIRST EMBODIMENT (AMD) | ADDITIONAL EMBODIMENT (AMD) | FURTHER EMBODIMENT (AMD) |
|---|---|---|---|---|---|---|
| Trouser Tear | Tear Strength | N | ISO 13937-2 | 10-30 | 15-27 | 18-24 |
| Elongation | Elongation | N | GMW3010 | 12-18 | 13-17 | 14.6 |
| Stretch | Stretch & Set | % | | 20-40 | 25-35 | 30 |
| Set | Stretch & Set | % | GMW3211 | 1-8 | 1.5-6 | 3 |

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. Additionally, the features of various implementing embodiments may be combined to form further embodiments of the disclosure.

What is claimed is:

1. A three-dimensional spacer fabric, comprising:
a first knit layer;
a second knit layer; and
monofilament spacer yarns extending between and connecting the first knit layer and the second knit layer, wherein the monofilament spacer yarns comprise a four-course repeating stitch notation of 1-0, 2-1, 3-4, 2-3;
the first knit layer consisting of pillar stitches and lay in stitches working together to form the first knit layer;
the second knit layer comprising a mesh fabric formed of a mirrored stitch formation including a first yarn formation and a second yarn formation such that the first yarn formation is a mirror image of the second yarn formation, and
wherein the three-dimensional spacer fabric has a compression force deflection of 10 to 15 kPa, as measured by ISO3386-1, in a machine direction (MD).

2. The three-dimensional spacer fabric of claim 1, wherein the three-dimensional spacer fabric has an air permeability of 3,800 to 4,800 l/dm2×min, as measured by DIN EN ISO 9237.

3. The three-dimensional spacer fabric of claim 1, wherein the pillar stitches comprise open pillar stitches.

4. The three-dimensional spacer fabric of claim 3, wherein the open pillar stitches alternate in direction.

5. The three-dimensional spacer fabric of claim 1, wherein the lay in stitches comprise courses formed in alternatingly spaced needle rows.

6. The three-dimensional spacer fabric of claim 5, wherein the alternatingly spaced needle rows are spaced 3-5 needle rows from adjacent needle rows.

7. The three-dimensional spacer fabric of claim 3, wherein the open pillar stitches have a repeating notation of 1-0, 0-1 and the lay in stitches have a repeating notation of 0-0, 3-3.

8. The three-dimensional spacer fabric of claim 1, wherein the mesh fabric comprises spaced apart openings having a length of 4.7 to 16 mm and a width of 0.80 to 3.18 mm.

9. The three-dimensional spacer fabric of claim 1, wherein the mirrored stitch formation comprises a repeating notation of (3-4, 3-2)×6, 3-4, 3-2, 2-1 (1-0, 1-2)×6, 1-0, 1-2, 2-3 and (1-0, 1-2)×6, 1-0, 1-2, 2-3, (3-4, 3-2)×6, 3-4, 3-2, 2-1.

10. A trim cover, comprising:
a trim layer having an upper surface and a lower surface; and
a three-dimensional spacer fabric secured to the lower surface of the trim layer, wherein the three-dimensional spacer fabric comprises:
a first knit layer;
a second knit layer; and
monofilament spacer yarns extending between and connecting the first knit layer and the second knit layer, wherein the monofilament spacer yarns comprise a four-course repeating stitch notation of 1-0, 2-1, 3-4, 2-3, the first knit layer consisting of pillar stitches and lay in stitches working together to form the first knit layer;
the second knit layer comprising a mesh fabric formed of a mirrored stitch formation including a first yarn formation and a second yarn formation such that the first yarn formation is a mirror image of the second yarn formation, wherein the three-dimensional spacer fabric has a compression force deflection of 10 to 15 kPa, as measured by ISO3386-1, in a machine direction (MD).

11. The trim cover of claim 10, wherein the trim layer comprises leather.

12. The trim cover of claim 10, wherein the three-dimensional spacer fabric has an air permeability of 3,800 to 4,800 l/dm2×min, as measured by DIN EN ISO 9237.

13. The trim cover of claim 10, wherein the pillar stitches comprise open pillar stitches.

14. The trim cover of claim 13, wherein the open pillar stitches are provided in alternate direction.

15. The trim cover of claim 10, wherein the lay in stitches comprise courses formed in alternatingly spaced needle rows.

16. The trim cover of claim 15, wherein the alternatingly spaced needle rows are spaced 3-5 needle rows from adjacent needle rows.

17. The trim cover of claim 16, wherein the open pillar stitches have a repeating notation of 1-0, 0-1 and the lay in stitches have a repeating notation of 0-0, 3-3.

18. The trim cover of claim 10, wherein the mesh fabric comprises spaced apart openings having a length of 4.7 to 16 mm and a width of 0.80 to 3.18 mm.

19. The trim cover of claim 10, wherein the mirrored stitch formation comprises a repeating notation of (3-4, 3-2)×6, 3-4, 3-2, 2-1 (1-0, 1-2)×6, 1-0, 1-2, 2-3 and (1-0, 1-2)×6, 1-0, 1-2, 2-3, (3-4, 3-2)×6, 3-4, 3-2, 2-1.

* * * * *